United States Patent [19]

Klaus

[11] Patent Number: 5,292,063
[45] Date of Patent: Mar. 8, 1994

[54] DAMPER ACTUATOR

[75] Inventor: Michael J. Klaus, Watertown, Wis.

[73] Assignee: Johnson Service Company, Milwaukee, Wis.

[21] Appl. No.: 830,623

[22] Filed: Feb. 4, 1992

[51] Int. Cl.⁵ .................................. G05D 23/00
[52] U.S. Cl. .......................... 236/1 G; 126/285 B; 110/163; 431/20
[58] Field of Search ............... 236/1 G; 110/163; 126/286, 285 B; 431/20

[56] References Cited

U.S. PATENT DOCUMENTS

| | | | |
|---|---|---|---|
| 2,155,642 | 4/1939 | Dewey | 236/1 G |
| 3,025,446 | 3/1962 | Leffler | 236/1 G |
| 4,017,024 | 4/1977 | Grostick et al. | 236/1 G |
| 4,084,743 | 4/1978 | Matthews et al. | 236/1 G |
| 4,087,045 | 5/1978 | Matthews et al. | 236/1 G |
| 4,264,033 | 4/1981 | Kutzner et al. | 236/1 G |
| 4,295,603 | 10/1981 | Clouser | 236/1 G |
| 4,321,030 | 3/1982 | Mathews | 236/1 G |
| 4,374,569 | 2/1983 | Hayes | 236/1 G |

Primary Examiner—John K. Ford
Attorney, Agent, or Firm—Foley & Lardner

[57] ABSTRACT

A stack damper control apparatus for positioning a stack damper and controlling a fuel source in response to closing of a temperature sensitive switch. Limit switches comprising drop cams are coupled to the drive shaft of the damper. In response to a call for heat, a motor turns the damper, coupling a source of energy to a fuel source when the damper is open and the limit switches transfer. A relay coil is energized to hold open a switch providing a parallel energization path for the motor. When the call for heat has been met and the temperature sensitive switch opens, the relay de-energizes closing the parallel energizing path and allowing the motor to close the damper. Provision is made for a safety interlock to ensure the fuel source is not activated when the damper is closed. Provision is also made for interface to a blocked vent shutoff system.

15 Claims, 4 Drawing Sheets

DAMPER ACTUATOR

BACKGROUND OF THE INVENTION

The present invention relates generally to a stack damper control apparatus adapted for use with a damper in an exhaust stack of a fuel-burning temperature conditioning system. More particularly, the present invention relates to an apparatus for opening and closing a stack damper and coupling an energy source to a source of fuel in response to a signal from a temperature switch.

Fuel-burning temperature control systems such as gas fired furnaces require a vent stack to carry products of combustion from the burner. Vent stacks typically include a damper. When the burner is not in operation, the damper moves to a closed position in which the damper substantially closes off the vent stack to prevent heat loss. When the burner is in operation, the damper moves to an open position in which the vent stack is substantially clear. For safe operation, the damper must be in its open position before the burner is ignited. Accordingly, systems for controlling dampers typically include an interlock mechanism to ensure that the damper is fully open before the burner operates.

U S. Pat. No. 4,087,045, issued to Matthews on May 2, 1978 is representative of the prior art. It describes a system for controlling damper positioning which includes a safety interlock between the stack damper and fuel supply to prevent operation of the fuel supply whenever the damper is in other than its fully open position. The damper activates the interlock circuit by means of limit switches operated by cams located on the damper shaft. The interlock also prevents operation of the burner in the event of a failure of he control apparatus which may be caused by, for example, the welding of the switch contacts together or the shifting of the cams employed in cam-operated switches. The interlock also prevents lock out of the system during momentary power operation.

While the interlock described in Matthews generally provides a way of ensuring safe operation of a damper and fuel supply in a temperature conditioning system, it does exhibit several shortcomings. For example, it requires three relays for implementation, one of which being a three tap relay. The relays employed are expensive to use and require many circuit component connections. In addition, the cam-operated limit switches are of the type having lobes which deflect the contact arms of the limit switches. Such limit switches require calibration to assure that contact is made or broken at the appropriate angular location when the damper is in its fully open or fully closed position. Calibration of the limit switches adds to manufacturing cost. Also, no provision is made for any visually discernable indication of damper position which would be important during the performance of operational safety checks and maintenance on the damper actuator system. Further, modern safety standards require gas burning appliances to have a blocked vent shutoff system which automatically shuts off the fuel supply when a blocked vent condition is sensed. Matthews makes no provision for such a system.

Accordingly, a need exists for improvements in a damper actuator system which accommodates a blocked vent shutoff system as well as a visual indicator of damper position. Also, a need exists for a damper actuator system which is simpler and less costly to construct and which does not require calibration of limit switches.

SUMMARY OF THE INVENTION

The present invention provides a stack damper control apparatus adapted for use with a damper in an exhaust stack of a fuel-burning temperature control system. The apparatus couples an energy source to a source of fuel in response to a signal from a temperature sensitive switch.

Accordingly, the apparatus includes motor means responsive to the signal and coupled to the damper for driving the damper between an open and a closed position. The apparatus further includes limit switch means coupled to the motor means for controlling the coupling of the energy source to the source of fuel. The apparatus still further includes storage means responsive to the signal for controlling the coupling of the energy source to the motor means. The storage means includes an energy storage means for storing energy. The storage means further includes first storage switch means responsive to the energy storage means for coupling the limit switch means to the energy storage mean. The storage means further includes second switch means for coupling the limit switch means to the energy source. The energy storage means stores energy in response to the signal and the first storage switch means couples the limit switch means to the energy storage means when the energy storage means stores energy. The second storage switch means couples the switch means to the energy source when said energy storage means does not store energy.

The present invention further provides a damper actuator adapted for use with a damper in an exhaust stack of a temperature conditioning system. The damper actuator also couples an electrical energy source to a fuel source in response to the closing of a temperature sensitive switch.

Accordingly, the damper actuator includes motor means coupled to the damper for rotating the damper between a closed and an open position. The damper actuator further includes first switch means coupled to the damper for coupling the electrical energy source to the fuel source when the damper is in an open position, the first switch means having a first contact coupled to the motor means, a common contact coupled to the electrical energy source, and a second contact. The damper actuator still further provides second switch means coupled to the damper for coupling the electrical energy source to the fuel source, the second switch means having a first contact, a common contact coupled to the second contact of the first switch means, and a second contact coupled to the fuel source. The first switch means and the second switch means coact in response to the motor means to form an electrically conducting path between the temperature-sensitive switch and the fuel source when the damper is in an open position. The damper actuator still further provides storage means coupled to the electrical energy source for coupling the motor means to the electrical energy source. The storage means includes a coil means for storing energy, the coil means having a first contact and a second contact coupled to system ground. The storage means further includes first storage switch means for coupling the electrical energy source to the coil means. The first storage switch means has a first contact coupled to the electrical energy source and a common contact coupled to the first contact of the coil means. The first storage switch means forms an electrically conducting path between the temperature sensing switch and the coil means in response to the coil means storing energy. The storage means still further includes second storage switch means for coupling the electrical energy source to the motor means when the coil means does not store energy, the second storage switch means having a first contact coupled to the electrical energy source, a common contact coupled to the motor means, and a second contact. The damper actuator still further provides third switch means coupled to the damper for coupling the storage means to the motor means, the third switch means having a first contact coupled to the common contact of the first storage switch means, a common contact coupled to the first contact of the first switch means, and a second contact coupled to the common contact of the second storage switch means. The third switch means coacts with the first switch means to form an electrically conducting path between the electrical energy source and the coil means when the damper is in a closed position. The third switch means coacts with the second storage switch means to form an electrically conducting path between the electrical energy source and the motor means when the damper is not fully closed and the coil means does not store energy.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings in the several figures of which identical reference characters indicate identical elements and wherein:

DETAILED DESCRIPTION OF THE INVENTION

Figure 1:
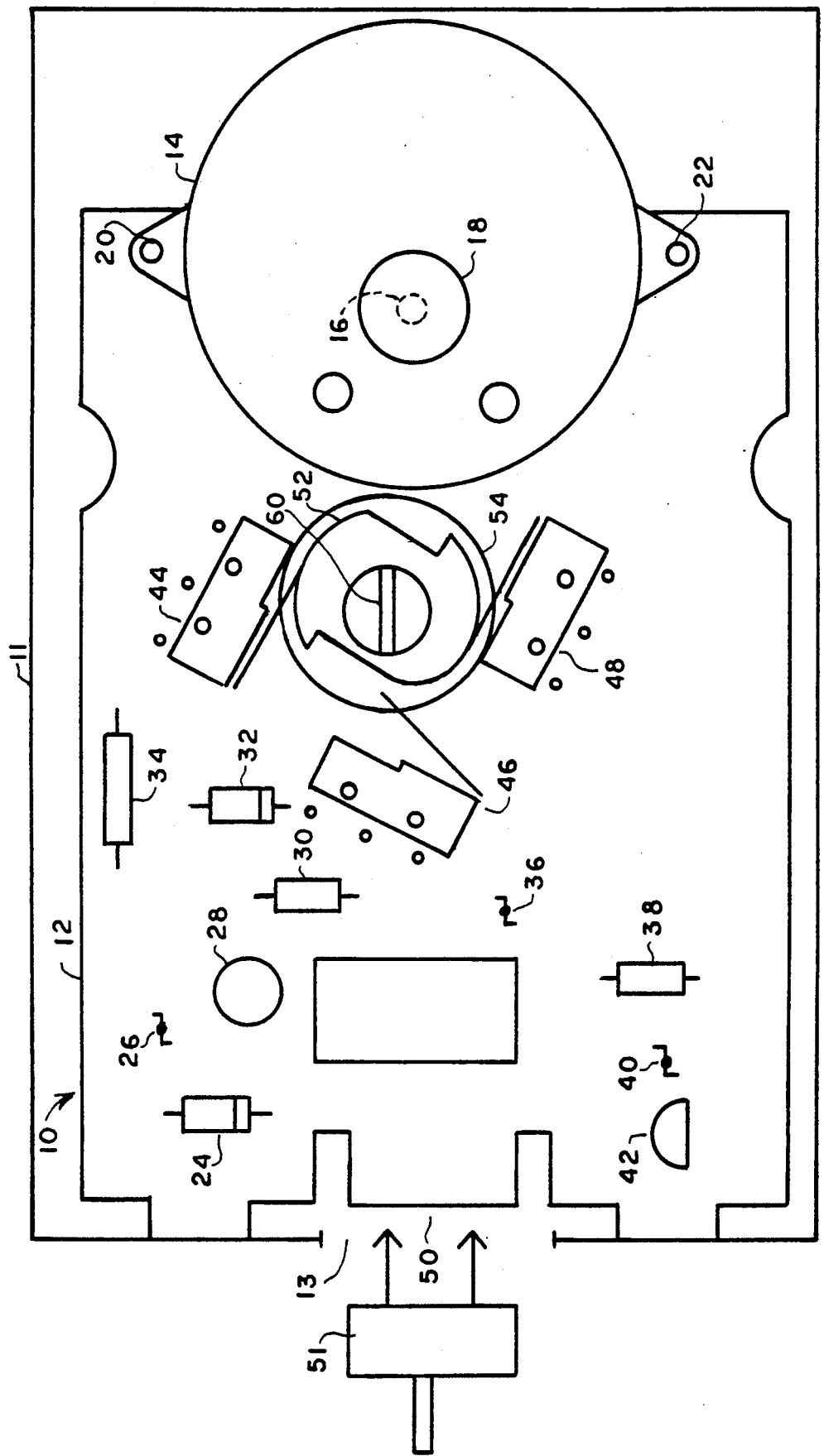
FIG. 1 is a top plan view of a damper actuator circuit assembly embodying the present invention.

FIG. 1 is a top view of a damper actuator circuit assembly illustrating the manner in which the present invention may be implemented in accordance with a preferred embodiment of the present invention. The circuit assembly 10 includes a printed circuit board 12 having mounted thereon a motor 14. Motor 14 includes a shaft 16 extending through a hole 18 in the printed circuit board 12. When completely assembled, the assembly 10 is preferably enclosed in a protective case 11, (FIG. 2), which keeps out dirt and other contaminants and assures the mechanical integrity of circuit assembly 10. Spacer 15 stabilizes motor 14 during assembly and maintains proper spacing of components of the completed assembly. The assembly comprising motor 14, printed circuit board 12, spacer 15 and protective case 11 is held together by fasteners 20 and 22. Preferably, the motor 14 is a permanent magnet motor which, together with the two fastener mounting of motor 14 on printed circuit board 12, serves to reduce the cost of parts and manufacture of the assembly 10.

The assembly 10 also includes several circuit components attached to printed circuit board 12. These circuit components include diode 24, first terminal 26, capacitor 28, diode 32, terminal 36, terminal 40, light emitting diode 42, and resistors 30, 34, and 38. These circuit elements may be soldered to printed circuit board 12, thus reducing manufacturing costs while improving reliability over the prior art which required component hand-wiring. The assembly 10 further includes switches 44, 46, 48 which are also mounted on printed circuit board 12 as by soldering.

The circuit board 12 includes a card edge connector 50. This allows circuit assembly 10 to be connected electrically and mechanically to external circuit components (not shown), by a board edge receptacle 51. Board edge connector 50 preferably is recessed inside protective case 11 and is connected to board edge receptacle 51 by inserting board edge receptacle 51 through an opening 13 in protective case 11.

Use of board edge connector 50 permits easy and quick installation and removal of the damper actuator. Signals coupled between circuit assembly 10 and the external circuit by means of board edge connector 50 may include power and ground potentials, input voltages to circuit assembly 10 and output voltages from circuit assembly 10.

Figure 2:
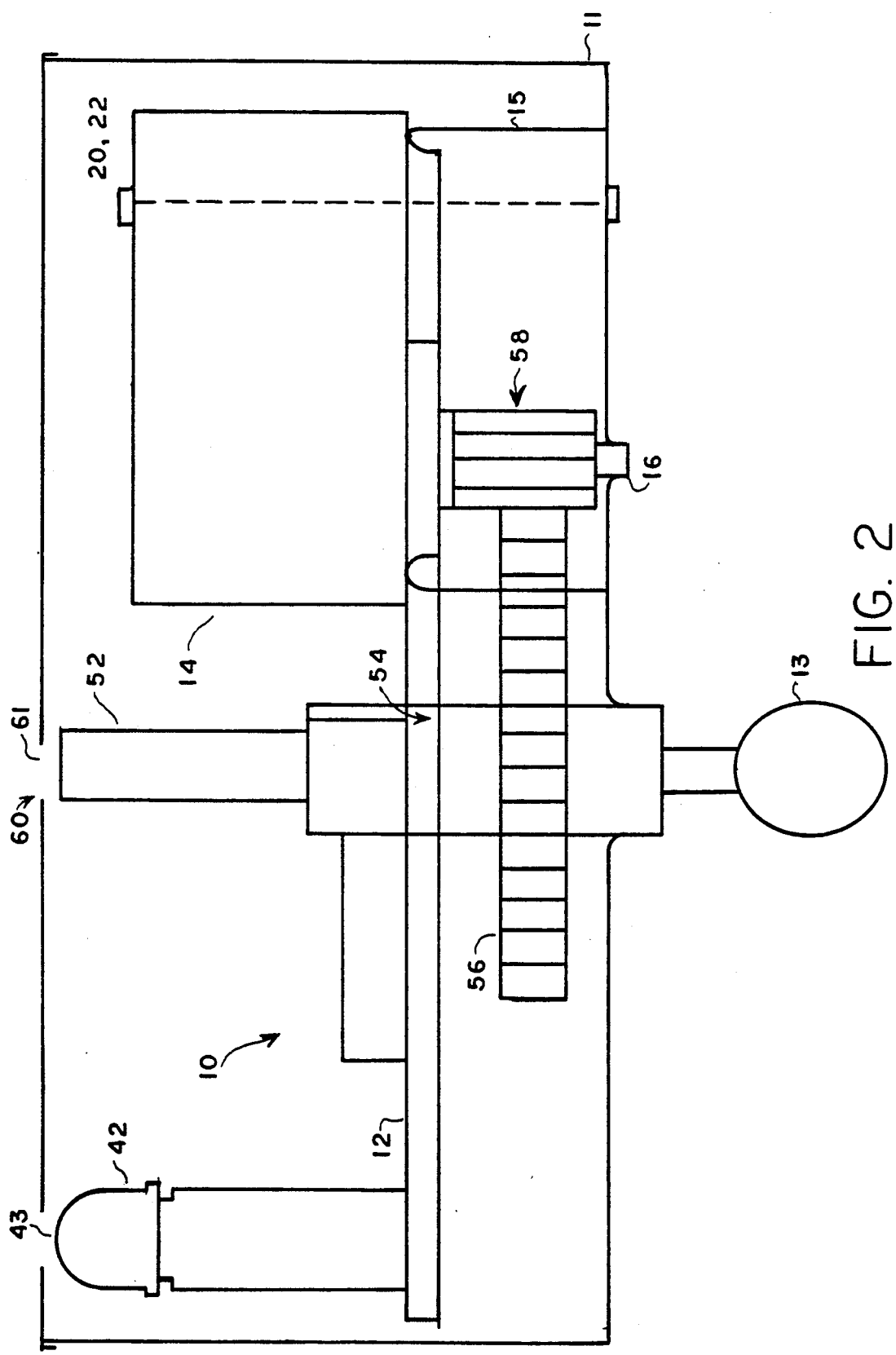
FIG. 2 is a side elevation view of the circuit assembly of FIG. 1, with certain components deleted, illustrating the relationship between the moving components of the damper actuator on opposite side of the circuit assembly.

Referring now to FIG. 2, it is a side elevation view of the circuit assembly 10 of FIG. 1. It will be noted that shaft 16 extends through hole 18 in printed circuit board 12. Also, drive shaft 52 extends through hole 54 in printed circuit board 12. Drive shaft 52 is also coupled to the damper 13 to be actuated.

Drive shaft 52 is coupled to motor shaft 16 by means of gears 56 and 58. Gear 56 is rigidly connected to drive shaft 52 and gear 58 is rigidly connected to motor shaft 16. Preferably, gear 56, drive shaft 52, notch 60 (FIG. 3) and cam notches 62 and 64 (FIG. 3) are incorporated in a single injection molded plastic part. Gear 56 is preferably wide-faced and made of a strong material, such as Ryton R-7, manufactured by Phillips 66 Company, or other similar high-temperature thermoplastic. This provides strong and wide faced gears in the final drive stage, where abuse is most likely to cause gear damage. Also, use of a high-temperature thermoplastic in construction of gear 56 enhances the durability of gear 56, which is in contact with the damper shaft which may be very hot.

It will be further noted in FIG. 2 that drive shaft 52 extends some distance above printed circuit board 12. The end of drive shaft 52 contains notch 60. Also, light emitting diode 42 extends some distance above printed circuit board 12. Preferably, drive shaft 52 and light emitting diode 42 extend to approximately the surface of the protective case 11. The protective case contains holes 61 and 43 which permit notch 60 in the end of drive shaft 52 and light emitting diode 42 respectively to be visible outside of the protective case. As a result, notch 60 and light emitting diode 42 provide a visual indicator of the position, open or closed, of the damper. Also, notch 60 and light emitting diode 42 provide a means of assuring the functionality of circuit assembly 10. By observing notch 60 and light emitting diode 42, the performance of the damper actuator in conjunction with the associated temperature conditioning system may be observed.

Figure 3:
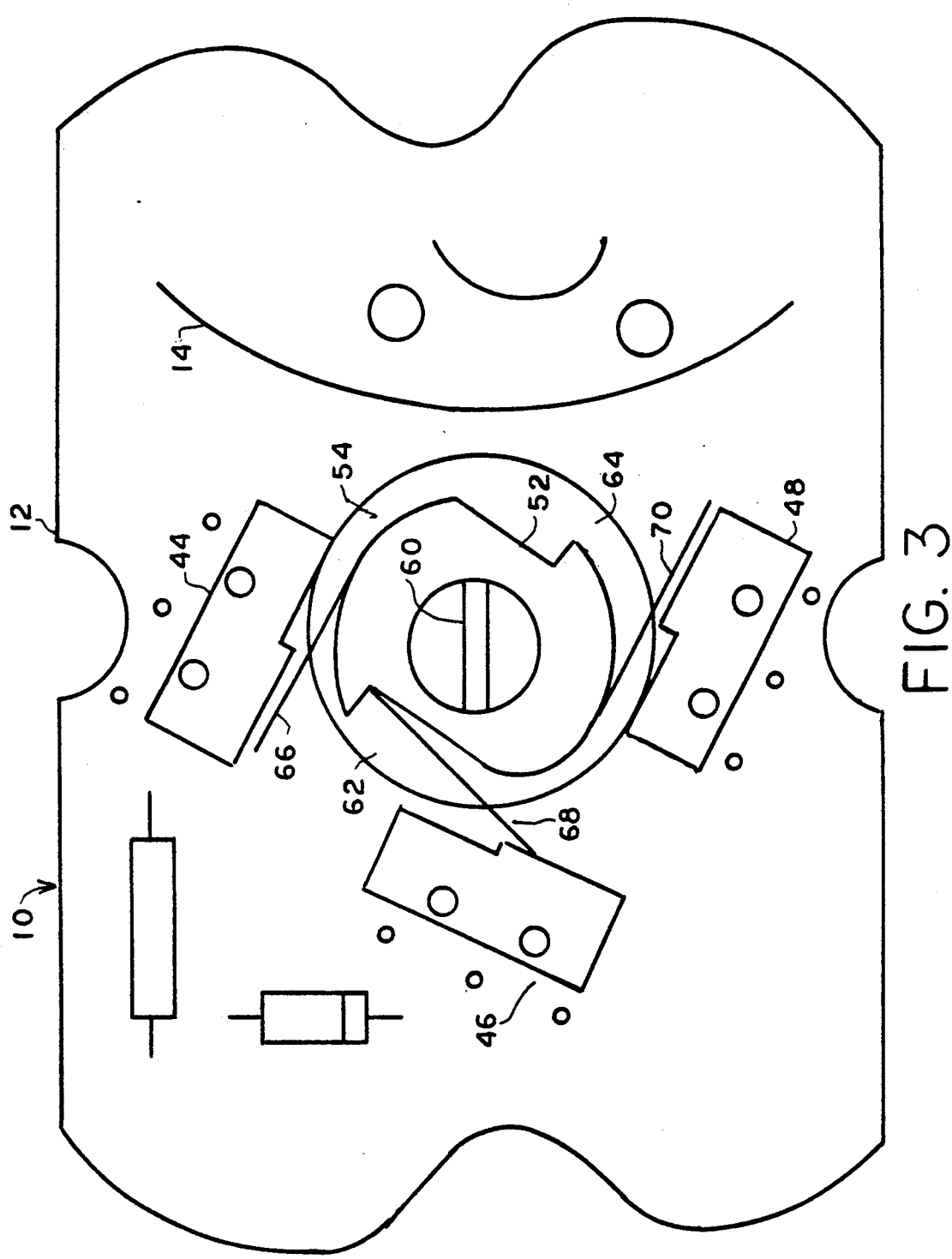
FIG. 3 is an enlarged top plan view of a portion of FIG. 1 showing in detail the mechanical interrelationships of cam-operated switches and an operating cam utilized in the preferred embodiment of the present invention.

FIG. 3 is an enlarged view of a portion of FIG. 1 showing in detail the mechanical interrelationships of the switches 44, 46, and 48 and the shaft 52. Shaft 52 includes cam notches 62 and 64 and switches 44, 46 and 48 include contact arms 66, 68 and 70 respectively. As drive shaft 52 is driven by motor 14 in a clockwise direction, contact arms 66, 68, 70 pivot from a normally open position, indicated by switches 44, 48 in FIG. 3, to a closed position, indicated by switch 46 in FIG. 3. When switches 44, 46, 48 are in the normally open position, an electrical connection is formed between a common contact and a first contact of the switch. When switches 44, 46, 48 are in the closed position, an electrical connection is formed between a common contact and a second contact of the switch. Thus, rotation of drive shaft 52 causes switches 44, 46, 48 to switch between the normally open and the normally closed positions in response to the interaction of contact arms 66, 68, 70 with cam notches 62 and 64.

Use of cam notches 62 and 64 provides several advantages over prior art cams which used raised lobes to activate contact arms 66, 68, 70. Cam notches 62 and 64 form drop cams, in which contact arms 66, 68, 70 function by dropping into cam notches 62, 64 in response to the pivoting of contact arms 66, 68, 70. Cam notches 62 and 64 thus permit precise blade positioning without calibration. In contrast, prior art cams with raised lobes required calibration during manufacturing to assure precise blade positioning and to account for manufacturing tolerances of individual components. In addition, despite initial calibration, prior art raised-lobe cams were susceptible to misalignment as a result of component deterioration over time. Thus, a damper actuator in accordance with the preferred embodiment of the present invention reduces manufacturing cost and improves product reliability relative to the prior art. Also, the drop cams may have a smaller diameter than raised-lobe cams and thus permit switches 44, 46, 48 and motor 14 to be located more closely together than did prior art raised-lobe cams. In addition, this small size and functionality also allows switches 44, 46, 48 to all be placed in the same plane rendering the switches more easily mountable. As a result, the printed circuit board 12 and the protective case 11 may be made smaller and at lower cost.

Figure 4:
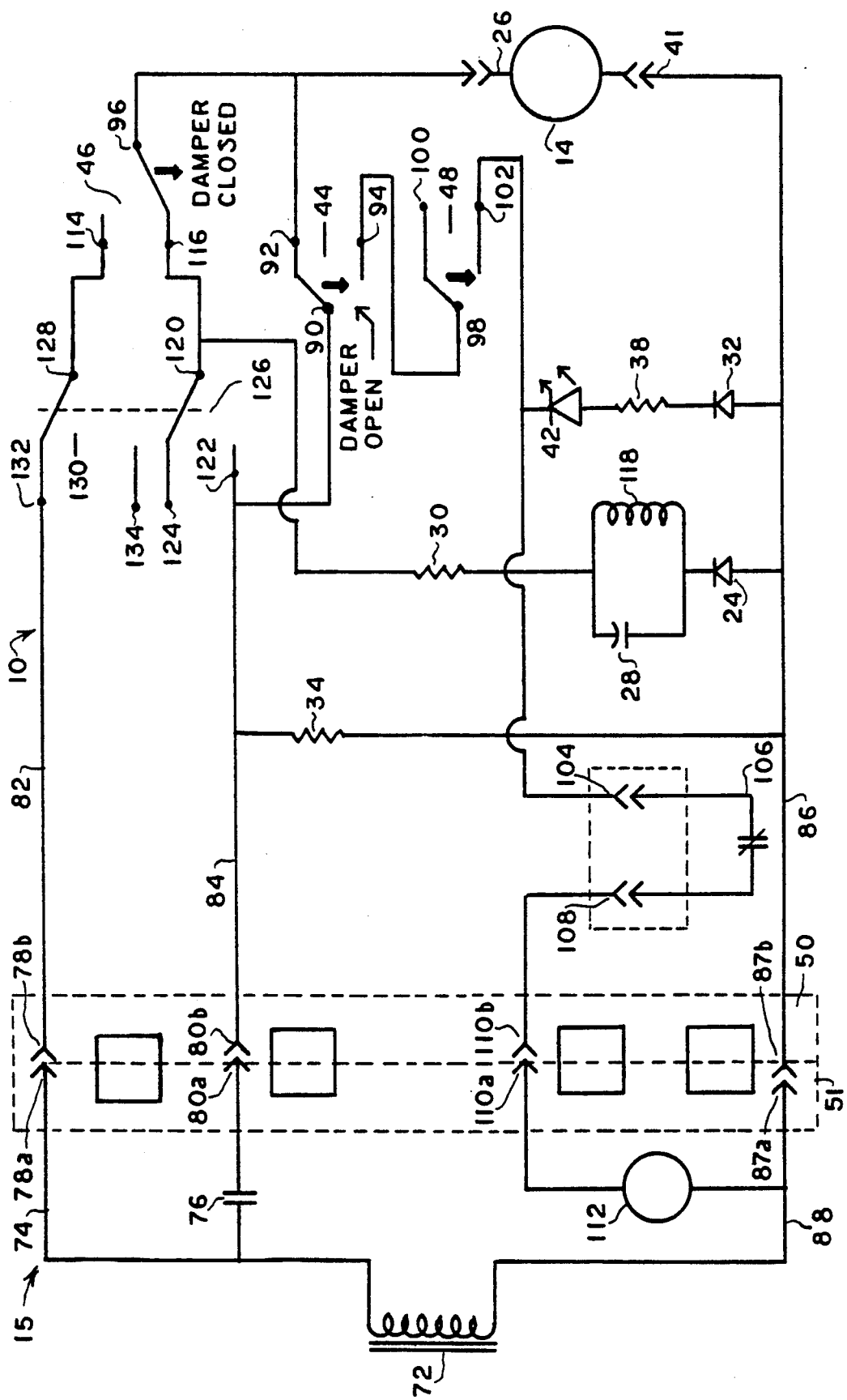
FIG. 4 is a schematic circuit diagram of the damper actuator of FIG. 1.

Referring now to FIG. 4, it is a schematic diagram of the circuit assembly 10 embodying the present invention and external circuitry 15 coupled thereto by the edge connector 50 and the receptacle 51. The external circuitry 15 includes energy source 72 coupled between ground bus 88 and power bus 74 and temperature sensitive switch 76. Energy source 72 preferably provides 24 volt, 60 Hz power. Temperature sensitive switch 76 may be a part of a thermostat which initiates a call for heat by closing temperature sensitive switch 76 in response to a low temperature condition and opening temperature sensitive switch 76 in response to temperature reaching the set point. The external circuitry 15 further includes a fuel source 112. Receptacle 51 includes contacts 78a, 80a, 110a, and 87a.

Board edge connector 50 includes contacts 78b which contacts contact 78a to couple power bus 74 to power bus 82 on printed circuit board 12. Board edge connector 50 also includes contact 80b which contacts contact 80a to couple temperature sensitive switch 76 to conductor 84 on printed circuit board 12. Conductor 84 is coupled to resistor 34.

Resistor 34 provides a load for temperature sensitive switch 76. Temperature sensitive switch 76 may be part of a set back thermostat powered by nickel cadmium batteries. These batteries may provide a small current which could adversely affect the circuit, for example, by causing motor 14 to turn and open the damper when it should be closed. Resistor 34 shunts this current to ground bus 86 on printed circuit board 12. Ground bus 86 is coupled to ground bus 88 by contact 87b of board edge connector 50 and contact 87a of receptacle 51.

Conductor 84 is also coupled to common contact 90 of switch 44. Switch 44, switch 46 and switch 48 together form a limit switch means, in which switch 44 is a first switch means, switch 48 is a second switch means, and switch 46 is a third switch means. Contact 92 of switch 44 is coupled to the first terminal 26 which is in turn coupled to motor 14. Contact 92 of switch 44 is also coupled to common contact 96 of switch 46. Contact 94 of switch 44 is coupled to common contact 98 of switch 48. Contact 100 of switch 48 may be unconnected.

Contact 102 of switch 48 is coupled to light emitting diode 42. Light emitting diode 42 is coupled to resistor 38 and diode 32 is coupled between resistor 38 and ground bus 86.

Contact 102 of switch 48 is also coupled to blocked vent shutoff system 106 by contacts 104. Blocked vent shutoff system 106 is coupled to board edge connector 50 by contacts 108. Board edge connector 50 includes contact 110b which contacts contact 110a of receptacle 51 to couple contacts 108 to fuel source 112. Fuel source 112 may, for example, include a valve to initiate a flow of fuel or an ignition system for igniting fuel.

Contact 116 of switch 46 is coupled to resistor 30. Resistor 30 is coupled to relay coil 118 and to capacitor 28 which are connected in parallel. Relay coil 118 and capacitor 28 are coupled to diode 24. Diode 24 is coupled to ground bus 86.

Contact 116 of switch 46 is also coupled to common contact 120 of first relay switch 126. Contact 122 of first relay switch 126 is coupled to conductor 84 and to common contact 90 of switch 44. Contact 124 of first relay switch 126 may be unconnected. Contact 114 of switch 46 is coupled to common contact 128 of second relay switch 130. Contact 132 of second relay switch 130 is coupled to power bus 82. Contact 134 of second relay switch 130 may be unconnected. Relay coil 118, first relay switch 126 and second relay switch 130 form a relay means.

Relay coil 118, first relay switch 126 and second relay switch 130 form a two pole relay. Relay coil 118 is energized when it is coupled to conductor 84. When relay coil 118 is energized, first relay switch 126 closes to connect common contact 120 and contact 122 and second relay switch 130 closes to connect common contact 128 to contact 134. When relay coil 118 is not energized, first relay switch 126 opens to connect common contact 120 to contact 124 and second relay switch 130 opens to connect common contact 128 to contact 132.

The assembly 10 operates as follows. FIG. 4 shows the assembly in the damper closed position. In response to a call for heat, temperature sensitive switch 76 closes coupling conductor 84 to energy source 72. Power is supplied to motor 14 via common contact 90 and contact 92 of switch 44. Power is also supplied to relay coil 118 via common contact 90 and contact 92 of switch 44 and common contact 96 and contact 116 of switch 46. Relay coil 118 is thus energized closing first relay switch 126, providing power through the parallel path consisting of contact 122 and common contact 120 of switch 126. This parallel path thus forms a holding path to keep relay coil 118 energized without regard for the state of switch 44 or switch 46.

In response to the supply of power, motor 14 turns drive shaft 52. The damper is coupled to drive shaft 52 and begins to move from its closed to its open position. Cam notches 62 and 64 on drive shaft 52 also turn causing switch 46 to transfer, connecting common contact 96 to contact 114. Relay coil 118 remains energized through contact 122 and common contact 120 of switch 126. Preferably, when drive shaft 52 reaches a position that is ten degrees less than the full open position of the damper, switch 48 transfers, connecting common contact 98 to contact 102. When drive shaft 52 reaches the fully open position of the damper, switch 44 transfers, removing power from motor 14 and applying power through common contact 90 and contact 94 to light emitting diode 42. Power is also applied to fuel source 112 causing ignition of fuel in the burner of the temperature conditioning system. The circuit remains in this state as long as temperature sensitive switch 76 remains closed.

When temperature sensitive switch 76 opens, for example after a call for heat has been met, power is removed from conductor 84. Power is also immediately removed from fuel source 112. Relay coil 118 thus becomes de-energized. First relay switch 126 opens, connecting common contact 120 to contact 124. Second relay switch 130 opens, connecting common contact 128 to contact 132. With second relay switch 130 open, energy source 72 is coupled to motor 14 by means of contacts 78a and 78b, power bus 82, second relay switch 130 and switch 46. With energy source 72 coupled to motor 14, energy source 72 supplies power to motor 14. Motor 14 begins to turn, to turn drive shaft 52 and the damper. When drive shaft 52 reaches a position where the damper is substantially closed, switch 46 transfers, coupling common contact 96 to contact 116. When switch 46 thus transfers, energy source 72 is no longer coupled to motor 14 and no longer supplies power to motor 14. As a result, motor 14 stops turning and the system is returned to its initial position.

Switch 48 forms a redundant switch which enhances safe operation. Switch 48 transfers, from coupling common contact 98 and contact 100 to coupling common contact 98 and contact 102, before switch 44 transfers. This ensures safe operation in the event switch 44 fails due to contact welding at contact 94. Switch 44 alternates between coupling energy source 72 to motor 14 and coupling energy source 72 to fuel source 112. If switch 44 fails due to contact welding at contact 94, energy source 72 could never be coupled to motor 14 by means of switch 44. Thus, motor 14 could not turn drive shaft 52 to move the damper to a substantially open position in response to a call for heat. If switch 48 is not present, switch 44 is coupled directly to fuel source 112. If switch 44 fails due to contact welding at contact 94, when temperature sensitive switch 76 closes in response to a call for heat, energy source 72 is coupled directly to fuel source 112 by means of switch 44 and welded contact 94. Because motor 14 was never coupled to energy source 72 under this failure condition, the damper was never moved to its substantially open position.

Operating fuel source 112 with the damper closed is inherently unsafe. The presence of switch 48 prevents this condition from occurring. Switch 48 creates a safety lockout mechanism because switch 48 is coupled to drive shaft 52 and transfers only in response to motor 14 turning drive shaft 52. If contact welding at contact 94 occurs preventing the supply of power to motor 14 over switch 44, switch 48 will not close and energy source 72 cannot be coupled to fuel source 112.

In accordance with the present invention, the assembly 10 also provides a safety interlock in the event of a power out condition. The present invention assures that fuel source 112 cannot be operated for a substantial period of time with the damper not fully open following a power outage. Fuel source 112 is only coupled to energy source 72 when switch 44 and switch 48 transfer in response to motor 14 turning drive shaft 52 to the substantially open position of the damper. During normal operation, with power supplied, relay coil 118 remains energized by means of first relay switch 126 and holds open second relay switch 130, assuring that power is not supplied to motor 14 to allow motor 14 to move the damper to its substantially closed position. In the event of a power out condition, relay coil 118 becomes de-energized, allowing second relay switch 130 to transfer, coupling energy source 72 to motor 14 by switch 46. When power to the system is restored, fuel source 112 is immediately coupled to energy source 72 by switch 44 and switch 48. However, when power is restored, power is also supplied to motor 14 by first relay switch 130 and switch 46, causing motor 14 to turn drive shaft 52 to close the damper. In response to the turning of drive shaft 52, switch 44 and switch 48 transfer, de-coupling fuel source 112 from energy source 72. The damper then travels through the closed position without stopping and continues to the open position where it stops and powers fuel source 112.

Further in accordance with the present invention, the assembly 10 provides for coupling to a blocked vent shutoff system (BVSS). Modern safety standards require a BVSS to ensure that a temperature conditioning system will automatically shut down in the event the vent becomes blocked for any reason. The BVSS may be installed in series with the ignition system of the temperature conditioning system. BVSS devices may provide a temperature sensitive switch on the draft hood to monitor the temperature of the products of combustion. If the BVSS senses a rise in this temperature beyond a predetermined threshold, for example due to a blocked vent condition, the BVSS will disconnect the ignition system and shut down the system.

Contact 104 and contact 108 couple the assembly 10 to BVSS 106. In the event of a blocked vent condition, BVSS 106 will de-couple energy source 72 from fuel source 112. However, motor 14 remains responsive to temperature sensitive switch 76. Thus, the damper may be held open to help alleviate and remedy the blocked vent condition. Because in many installations of temperature conditioning systems, a damper actuator and a BVSS will by located in close physical proximity to each other, the interface to the BVSS included in accordance with this embodiment facilitates wiring and interconnection of the overall temperature condition system and encourages safe installation and operation of the system.

While particular embodiments of the present invention have been shown and described, modifications may be made, and it is therefore intended in the appended claims to cover all such changes and modifications which fall within the true spirit and scope of the invention.

What is claimed is:

1. A stack damper control apparatus, adapted for use with a damper in an exhaust stack of a fuel-burning temperature conditioning system, for coupling an energy source to a source of fuel in response to a signal from a temperature sensitive switch, said apparatus comprising:

motor means responsive to said signal and coupled to said damper for driving said damper between a substantially open and a substantially closed position;

limit switch means coupled to said motor means for controlling the coupling of said energy source to said source of fuel when said motor means drives said damper to said open position;

relay means responsive to said signal for controlling coupling of said energy source to said motor means, said relay means comprising a relay coil, first relay switch means responsive to said relay coil for coupling said limit switch means to said relay coil, and second relay switch means responsive to said relay coil for coupling said limit switch means to said energy source, wherein said relay coil stores energy in response to said signal, and said first relay switch means couples said limit switch means to said relay coil when said relay coil stores energy and said second relay switch means couples said limit switch means to said energy source when said relay means does not store energy.

2. A stack damper control apparatus as defined in claim 1 wherein said relay means comprises a two pole relay.

3. A stack damper control apparatus as defined in claim 1 further comprising a blocked vent shut off means coupled between said limit switch means and said source of fuel for disconnecting said source of fuel from said energy source.

4. A stack damper control apparatus, adapted for use with a damper in an exhaust stack of a fuel burning temperature conditioning system, for coupling an energy source to a source of fuel in response to a signal from a temperature sensitive switch, said apparatus comprising:

motor means responsive to said signal and coupled to said damper for driving said damper between a substantially open and a substantially closed position;

limit switch means coupled to said motor means for controlling the coupling of said energy source to said source of fuel when said motor means drives said damper to said open position, said limit switch means comprising first switch means responsive to said motor means for coupling said energy source to said motor means and second switch means responsive to said motor means for coupling said first switch means to said source of fuel, and third switch means responsive to said motor means for coupling said motor means to said first relay switch means when said damper is in said substantially closed position and coupling said motor means to said second relay switch means when said damper is not in said substantially closed position, wherein said first switch means couples said energy source to said motor means when said damper is not in said substantially open position and couples said energy source to said second switch means when said damper is in said substantially open position and said second switch means couples said first switch means to said source of fuel when said damper is in said substantially open position.

5. A stack damper control apparatus as defined in claim 4 wherein said second switch means couples said first switch means to said source of fuel before said first switch means couples said energy source to said second switch means.

6. A stack damper control apparatus as defined in claim 5 wherein said first switch means, said second switch means and said third switch means respond to a cam coupled to said motor means.

7. A stack damper control apparatus as defined in claim 6 wherein said cam comprises a drop cam.

8. A stack damper control apparatus as defined in claim 5 further comprising indicator means for providing a visual indication of the position of said damper.

9. A stack damper control apparatus as defined in claim 8 wherein said indicator means comprises a light emitting diode.

10. A damper actuator adapted for use with a damper in an exhaust stack of a temperature conditioning system and for coupling an electrical energy source to a fuel source in response to the closing of a temperature-sensitive switch, said damper actuator comprising;

motor means coupled to said damper for rotating said damper between a substantially closed and a substantially open position;

first switch means coupled to said damper for coupling said electrical energy source to said fuel source when said damper is in said substantially open position, sad first switch means having a first contact coupled to said motor means, and a common contact coupled to said electrical energy source, and a second contact;

second switch means coupled to said damper for coupling said electrical energy source to said fuel source, said second switch means having a first contact, a common contact coupled to said second contact of said first switch means, and a second contact coupled to said fuel source, said first switch means and said second switch means coacting in response to said motor means to form an electrically conducting path between said temperature-sensitive switch and said fuel source when said damper is in said substantially open position;

relay means coupled to said electrical energy source for coupling said motor means to said electrical energy source, said relay means comprising a coil means for storing energy, said coil means having a first contact and a second contact coupled to system ground, said relay means further comprising first relay switch means for coupling said electrical energy source to said coil means, sad first relay switch means having a first contact coupled to said electrical energy source, and a common contact coupled to said first contact of said coil means, said first relay switch means forming an electrically conducting path between said temperature-sensing switch and said coil means in response to said coil means storing energy, said relay means further comprising second relay switch means for coupling said electrical energy source to said motor means when said coil means does not store energy, said second relay switch means having a first contact coupled to said electrical energy source, a common contact coupled to said motor means and a second contact; and third switch means coupled to said damper for coupling said relay means to said motor means, said third switch means having a first contact coupled to said common contact of said first relay switch means, a common contact coupled to said first contact of said first switch means, and a second contact coupled to said common contact of said second relay switch means, said third switch means coacting with said first switch means to form an electrically conducting path between said electrical energy source and said coil means when said damper is substantially closed, and said third switch means coacting with said second relay switch means to form an electrically conducting path between said electrical energy source and said motor means when said damper is not fully closed and said coil means does not store energy.

11. A damper actuator as defined in claim 10 wherein said relay means comprises a two pole relay.

12. A damper actuator as defined in claim 11 wherein said first switch means, said second switch means and said third switch means are coupled to said damper by means of one or more drop cams coupled to said damper.

13. A damper actuator as defined in claim 12 further comprising blocked vent shutoff means coupled between said second switch means and said fuel source for independently disconnecting said fuel source from said electrical energy source.

14. A damper actuator as defined in claim 12 further comprising indicator means coupled to said second switch means for indicating whether said damper is in said substantially open or said substantially closed position.

15. A damper actuator as defined in claim 14 wherein said indicator means comprises a light emitting diode.

* * * * *

UNITED STATES PATENT AND TRADEMARK OFFICE
CERTIFICATE OF CORRECTION

PATENT NO. : 5,292,063
DATED : March 8, 1994
INVENTOR(S) : J. Michael Klaus

It is certified that error appears in the above-indentified patent and that said Letters Patent is hereby corrected as shown below:

On title page, item [75] Inventor: "Michael J. Klaus" should read --J. Michael Klaus--

Signed and Sealed this

Sixteenth Day of August, 1994

Attest:

BRUCE LEHMAN

Attesting Officer

Commissioner of Patents and Trademarks